June 19, 1951     G. E. PETERS ET AL     2,557,139
FOLDING HANDLE
Filed March 14, 1947
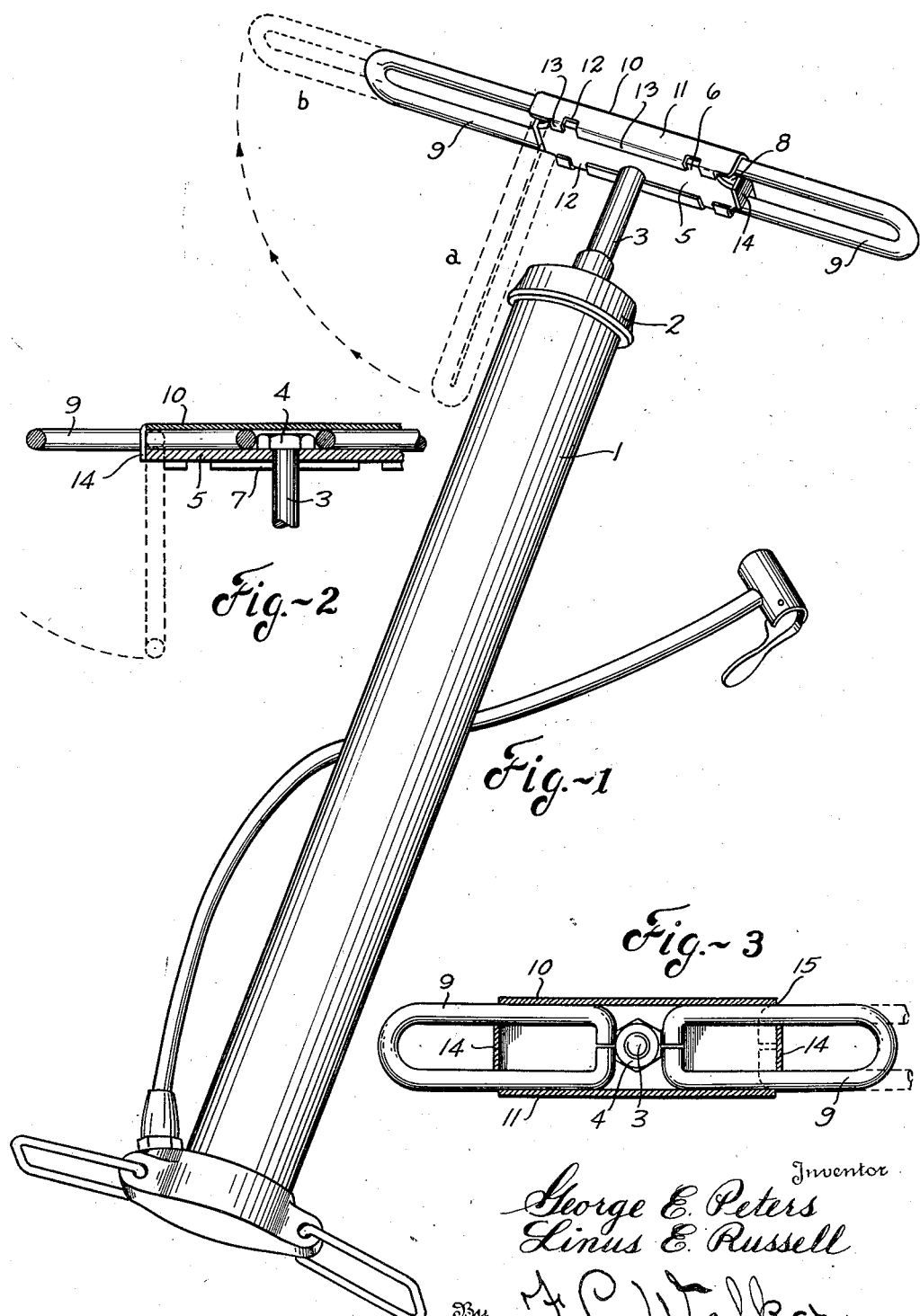

Patented June 19, 1951

2,557,139

UNITED STATES PATENT OFFICE 2,557,139

FOLDING HANDLE

George E. Peters and Linus E. Russell, Springfield, Ohio, assignors to Peters & Russell, Inc., Springfield, Ohio, a corporation of Ohio Application March 14, 1947, Serial No. 734,762

10 Claims. (Cl. 230—218)

This invention pertains to manually operated pumps of the type having reciprocatory pistons actuated by cross head handles carried by the stem of the piston, and more particularly to a folding handle therefor to facilitate storage.

There is contemplated a reciprocatory pump piston having a multi-part cross head handle, the handle portions of which are mounted for both reciprocatory and oscillatory adjustment relative to their mounting means. By such construction the handle portions may be moved from a transversely aligned operative position to a substantially parallel retracted position for storage.

The object of the invention is to improve the construction, as well as the means and mode of operation of folding cross head handles whereby they may not only be economically manufactured but will be more efficient in use, uniform in operation, having relatively few parts, and be unlikely to get out of repair.

A further object of the invention is to provide a relatively quick acting handle which may be readily extended and contracted, which does not involve the use of loose parts.

A further object of the invention is to provide a handle structure which will be strong and resistant when assembled in operative relation, but capable of being readily and quickly retracted into compact form for storage.

A further object of the invention is to provide a folding handle having the advantageous structural features and inherent meritorious characteristics, and mode of assembly and operation herein set forth.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings or their equivalents.

For illustrative purposes, the invention is illustrated as embodied in a pump of the tire inflation type, but is obviously not limited thereto. In the drawing, wherein is shown the preferred, but not necessarily the only form of embodiment of the invention, Fig. 1 is a perspective view of a tire pump showing the cross head handle embodying the present invention assembled thereto, with the handle sections shown in transversely aligned operative position.

Fig. 2 is a side elevation of the handle assembly, partly in section showing the relation of the several parts when in transversely aligned operative position.

Fig. 3 is a top view of the handle assembly, also partly in section, showing the several parts in the same position as in Figs. 1 and 2.

In each of the three views, the position of the handle sections, when folded into parallel relation for storage is shown in dotted lines.

Like parts are indicated by similar characters of reference throughout the several views.

Referring to the drawing, 1 indicates a conventional cylinder for a reciprocatory piston pump, such as is ordinarily used for pneumatic tire inflation. The top of the cylinder 1 is surmounted by a dome shaped cap 2. A conventional piston is mounted to reciprocate within the cylinder 1, the rod 3 of which extends through the cap 2 to receive the folding cross head handle forming the subject matter hereof.

The upper end of the piston rod 3 is threaded to receive a locking nut 4 by means of which the cross head handle assembly is retained on the piston rod.

The cross head assembly comprises a base plate or bottom 5 having a pair of spaced lateral projections 6 on each side thereof for interlocking engagement with the cover portion 7. Each corner of the base plate 5 is recessed as at 8 to provide clearance for the loop or handle portion 9 when folded in parallel relation with the cylinder 1 for storage.

The handle portions 9 comprise substantially closed loops formed of steel rodding, of such size and proportion as to just fit within the width of the base 5. Each loop 9 is of slightly less length than the base 5 so that when in transverse aligned relation, and abutting against the nut 4, substantially one half of each loop will project beyond the ends of the base 5 to form the operating handle.

The formed handle portions 9 are placed on the base 5 and the cover member 10 is then secured to the base 5, thereby enclosing and retaining the handles 9 in assembled relation. The cover 10 has downturned side flanges 11 which are notched at 12 to receive the projections 6 on the base. These projections 6 in cooperation with the notches 12 serve to locate the cover in fixed relation with the base and also interlock the two parts of the cross head to prevent relative longitudinal movement of the base and cover. The downturned flanges 11 are then inturned under the base 5 as at 13 to prevent vertical displacement of the cover relative to the base.

The cover 10 is assembled to the base 5 under just sufficient pressure to yieldingly clamp the handles 9 therebetween with a slight "push" fit. The cover 10 has downturned ends 14 which abut against the ends of the base 5 and serve as detents or stops for limiting outward travel movement of the handle portions 9. The downturned ends are also notched or recessed at 15 to permit passage of the handle portions 9 therethrough, which notches also permit downward swinging or pivotal movement of the handle portions 9 into the notches 8 in the base 5, when the handles are folded downwardly into parallel relation, as shown in dotted lines in Figs. 1 and 2.

For use, the handle portions 9 are swung from the dotted line position *a* to the dotted line position *b* in Fig. 1, pivoting about the downturned ends 14 and then pushed inwardly to the full line position shown in the figure. The nut 4 serves as a stop limiting the travel movement of the loop in this direction. The pressure under which the loops are placed by the assembly of the cover 10 to the base 5 creates sufficient resistance to such reciprocatory movement of the handles 9 to prevent looseness or play in the assembly. The handles 9, once they are brought into aligned relation, will remain in such position until manually changed to the folded position. To fold the handles downwardly for storage, it is only necessary to pull the handles outwardly relative to the cross head until the handles engage the downturned flanges 14 of the cover 10. This position is shown in dotted lines at *b* in Fig. 1, the handle being engaged with the flange 14 in Figs. 2 and 3 (dotted lines). In such position, the handles may be folded downwardly into parallel relation, such oscillatory movement thereof being permitted by the recesses 8 in the base 5.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. A cross handle for a hand operated pump wherein a reciprocatory piston having an extended piston rod is manually reciprocated within an elongated cylinder having a discharge outlet, characterized by a foldable handle assembly secured to the projecting end of the piston rod, including a base plate secured to the piston rod, a pair of elongated link shaped handle members loosely supported upon said base for reciprocatory and oscillatory motion relative thereto, a cover member overlying and enclosing said handle members and secured to the base, interlocking configurations in said cover and base preventing relative movement thereof, downturned ends on said cover members the ends of which are recessed to receive the arms of the link shaped handle members, said ends being intermediate the arms of the link shaped handle members and forming a stop against which the link is engageable at one limit of its reciprocatory motion, reciprocatory movement of the link in the opposite direction being limited by engagement thereof with the end of the piston rod, recesses in each corner of the base member to receive the arms of the link shaped handle members when oscillated into parallel relation, the construction and arrangement being such that the handle members may be reciprocated in a common plane, relative to the base and cover, and oscillated relative thereto at the outer limit of their reciprocatory motion.

2. A cross handle for a hand operated pump wherein a reciprocatory piston having an extended piston rod is manually reciprocated within an elongated cylinder having a discharge outlet, characterized by a foldable handle assembly secured to the projecting end of the piston rod, including a base plate secured to the piston rod, a pair of relatively adjustable handle members loosely supported upon said base plate and projecting outwardly therefrom, a cover member overlying said handle members and secured to the base plate, a series of projections on said base plate having interlocking engagement with the cover member to prevent relative movement of the plate and cover, a detent on each end of the cover member limiting the movement of the handle members in one direction, the piston rod limiting the movement of the handle members in the opposite direction, recesses in each end of the base plate permitting oscillatory movement of the respective handle sections when in engagement with the respective detents, the construction and arrangement being such that the handle sections are capable of reciprocatory movement relative to the base and cover within the space therebetween, and also capable of oscillatory movement relative thereto when at the outer limit of their reciprocatory motion.

3. A foldable cross handle for manually actuating a conventional reciprocatory piston pump of the type having a piston rod projecting from the top thereof, including a cross head comprising a base member secured to the projecting end of the piston rod, a cover member secured thereto in relatively spaced relation, interlocking configurations on said members preventing relative movement thereof, a plurality of recesses in the cross head to receive a pair of reciprocatory and oscillatory handle members, a pair of handle members enclosed within said cross head and projecting through the recesses therein, said handle members being movable in a common plane relative to the cross heads, stops limiting the movement of said handle members in each direction, said handle members being capable of oscillatory motion at one limit of their reciprocatory motion, and recesses in the base member to receive said handle members when in oscillated position.

4. A foldable handle for a reciprocatory piston pump, a pair of adjustable handle sections adjustable from an aligned relation substantially transversely of the direction of reciprocation of the piston to positions substantially parallel relation therewith, a mounting head therefor within which the handle sections are enclosed under yielding tensioned resistance against the influence of which the handle sections are slidingly adjustable relative thereto, detents on said mounting head limiting outward movement of the handle sections relative thereto, and means permitting oscillatory motion of the handle sections when in engagement with said detents comprising recesses in the mounting head within which the handle sections are seated when oscillated into substantially parallel relation with the piston rod.

5. A foldable cross handle for manually actuating a conventional reciprocatory piston pump including a pair of cooperating handle sections movable from aligned relation substantially transversely of the direction of reciprocation of the pump piston to a retracted relation substantially parallel therewith, a mounting head therefor carried by the pump piston within which the handle sections are enclosed under yielding tensioned resistance against the influence of which the handle sections have successive sliding and pivotal motion relative to the head.

6. A foldable cross handle for manually actuating a conventional reciprocatory piston pump, including a pair of oscillatory handle sections movable from aligned relation substantially transversely of the direction of reciprocation of the pump piston to a retracted relation substantially parallel therewith, a mounting unit therefor comprising two relatively spaced members, within which the handle sections are enclosed under yielding tensioned resistance against the influence of which the handle sections are capable of reciprocatory motion relative to the unit, detents on the ends of said unit engageable with the handle sections to limit the reciprocatory motion thereof, the construction and arrangement being such that the handle sections when engaged by said detents may be oscillated into substantially parallel relation with the piston.

7. A foldable cross handle for a conventional reciprocatory piston pump, including a pair of handle sections movable from aligned relation transversely of the direction of reciprocation of the pump piston into substantially parallel relation therewith, a two piece mounting therefor secured to the pump piston, the pieces of which are in relatively spaced relation and intermediate which the handle sections are enclosed under yielding tensioned resistance against the influence of which the handle sections are capable of sliding motion relative to the mounting, and a pivotal connection for said handle sections engaged by said sections at the limit of their sliding motion, the construction and arrangement being such that the handle sections are first slidingly and then pivotally engaged with the mounting.

8. A foldable cross handle for a conventional reciprocatory piston pump, including a pair of handle sections movable from aligned relation transversely of the direction of reciprocation of the pump piston into substantially parallel relation therewith, a mounting therefor secured to the pump piston within which the handle sections are telescopically engaged for sliding movement relative thereto, and detents on said mounting limiting the extent of telescopic movement of the handle sections relative thereto against which detents the handle sections may be pivoted into parallel relation with the pump piston.

9. A foldable cross handle for a conventional reciprocatory piston pump, including a cross head, a pair of extensible and contractible handle sections supported within the head for sliding motion relative thereto, detents maintaining said handle sections in engagement with the head, and means for pivotally mounting said handle sections at the limit of their sliding movement, the construction and arrangement being such that the handle sections may be moved from aligned relation transversely of the direction of reciprocation of the pump piston into substantially parallel relation therewith.

10. A foldable cross handle for a conventional reciprocatory piston pump, including a pair of handle sections normally disposed in opposed horizontal relation, a mounting therefor secured to the pump piston, within which mounting the handle sections are secured for movement relative thereto, and interengaging members on said handle sections and mounting by means of which the handle sections are first slidingly and then pivotally engaged with the mounting during the folding thereof.

GEORGE E. PETERS.
LINUS E. RUSSELL.

REFERENCES CITED

The following references are of record in the file of this patent:

UNITED STATES PATENTS

| Number | Name | Date |
|---|---|---|
| 210,669 | Coates | Dec. 10, 1878 |
| 1,307,039 | Casler | June 17, 1919 |
| 1,432,054 | Cuff | Oct. 17, 1922 |
| 1,487,283 | Stevenson | Mar. 18, 1924 |
| 1,864,700 | Wade | June 28, 1932 |